United States Patent
Lim et al.

(10) Patent No.: US 9,170,895 B2
(45) Date of Patent: Oct. 27, 2015

(54) MEMCACHED SERVER REPLICATION

(71) Applicant: Hewlett-Packard Development Company, L.P., Houston, TX (US)

(72) Inventors: Kevin T. Lim, La Honda, CA (US); Sai Rahul Chalamalasetti, Houston, TX (US); Mitchel E. Wright, The Woodlands, TX (US); Parthasarathy Ranganathan, San Jose, CA (US); Alvin AuYoung, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 336 days.

(21) Appl. No.: 13/755,647

(22) Filed: Jan. 31, 2013

(65) Prior Publication Data

US 2014/0215260 A1    Jul. 31, 2014

(51) Int. Cl.
*G06F 11/00* (2006.01)
*G06F 11/20* (2006.01)

(52) U.S. Cl.
CPC ........ *G06F 11/2025* (2013.01); *G06F 11/2041* (2013.01); *G06F 11/2046* (2013.01); *G06F 11/2097* (2013.01)

(58) Field of Classification Search
CPC ..................................... G06F 11/202–11/2051
See application file for complete search history.

(56) References Cited

U.S. PATENT DOCUMENTS

| | | | |
|---|---|---|---|
| 8,433,684 B2 * | 4/2013 | Ruiz Munoz | 707/649 |
| 2011/0307654 A1 * | 12/2011 | Ma et al. | 711/105 |
| 2012/0246190 A1 | 9/2012 | Surtani et al. | |
| 2012/0246202 A1 | 9/2012 | Surtani et al. | |
| 2012/0331084 A1 * | 12/2012 | Chang et al. | 709/213 |

OTHER PUBLICATIONS

Couchbase Server Manual 2.0, Dec. 20, 2012.*
Couchbase Under the Hood, 2013.*
Ouyang et al., "SSD-Assisted Hybrid Memory to Accelerate Memcached over High Performance Networks", 2012 41st International Conference on Parallel Processing, pp. 470-479.*
"Dealing with Memcached Challenges: Getting the performance without the gotchas", Couchbase, whitepaper, download date Jan. 31, 2013.< http://www.couchbase.com/memcached >.
Roberts, David Andrew, "Efficient Data Center Architectures Using Non-Volatile Memory and Reliability Techniques", 2011. < http://web.eecs.umich.edu/~tnm/trev_test/dissertationsPDF/daveR-ref-fixed.pdf >.
Whelan, Timothy, "An FPGA Based Implementation of a Packet Filter", Nov. 10, 2010. < http://www.cs.ru.ac.za/research/g07w1974/documents/short_paper.pdf >.

* cited by examiner

*Primary Examiner* — Michael Maskulinski
(74) *Attorney, Agent, or Firm* — Mannava & Kang, P.C.

(57) ABSTRACT

According to an example, data for a memcached server is replicated to a memcached replication server. Data operations for the memcached server may be filtered for backing up data to the memcached replication server.

15 Claims, 3 Drawing Sheets

MEMCACHED SERVER REPLICATION

BACKGROUND

Memcached servers are often used for caching large amounts of small data objects for web sites. Memcached servers are placed between the front-end web servers and the back-end data store. They provide caching of content or queries from the data store, alleviating the need to access the back-end. This caching reduces the latency of accesses for the front-end servers and the load on the back-end servers. Popular social media web sites are known to use memcached servers. Each memcached server may have over 64 Gigabytes (GB) of memory per server but sizes may vary. Popular social media web sites may use thousands of memcached servers to maintain response times satisfactory to their users.

BRIEF DESCRIPTION OF THE DRAWINGS

Embodiments are described in detail in the following description with reference to the following figures. The figures show examples of the embodiments and like reference numerals indicate similar elements in the accompanying figures.

DETAILED DESCRIPTION

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the description of the embodiments.

According to an embodiment, a memcached system includes a replication control circuit for a memcached server that filters and directs traffic for backing up data to a memcached replication server in a memcached replication system. The memcached replication server comprises a hybrid memcached server including two types of memory technologies. One type of memory technology may be non-volatile memory (NVM) and a second type of memory technology may have higher performance than the NVM. For example, the second type of memory technology has faster data access rates than the NVM. The NVM may be slower but may also be cheaper than the higher performance memory technology. Also, the memcached replication server may have more NVM than the higher performance memory technology. Examples of the NVM technologies may include Phase Change Memory (PCM) or memristor. An example of the higher performance memory technology is dynamic random-access memory (DRAM). The memcached servers and the memcached replication servers can use solid-state memory technologies instead of hard drives to increase data access rates. However, if a cache miss occurs, an application server may attempt to retrieve the data from a data store which may be comprised of hard drives. In another example, the replication memcached server may use a combination of memory and hard drives.

The replication control circuit reduces replication processing overhead that could be incurred by the central processing unit (CPU) of the memcached server because the replication control circuit handles the retransmission of selected cache commands to the memcached replication server. Also, because the replication control circuit sends selected commands rather than all commands received from an application server for data requests, less network bandwidth is used for the replication. Additionally, a single memcached replication server may serve multiple active memcached servers. Active means the memcached server is currently being used by an application to cache data. Using NVM at the memcached replication server allows lower cost, higher capacity memory than using only DRAM and enables a single replication server to have enough capacity to serve multiple active memcached servers.

Figure 1:
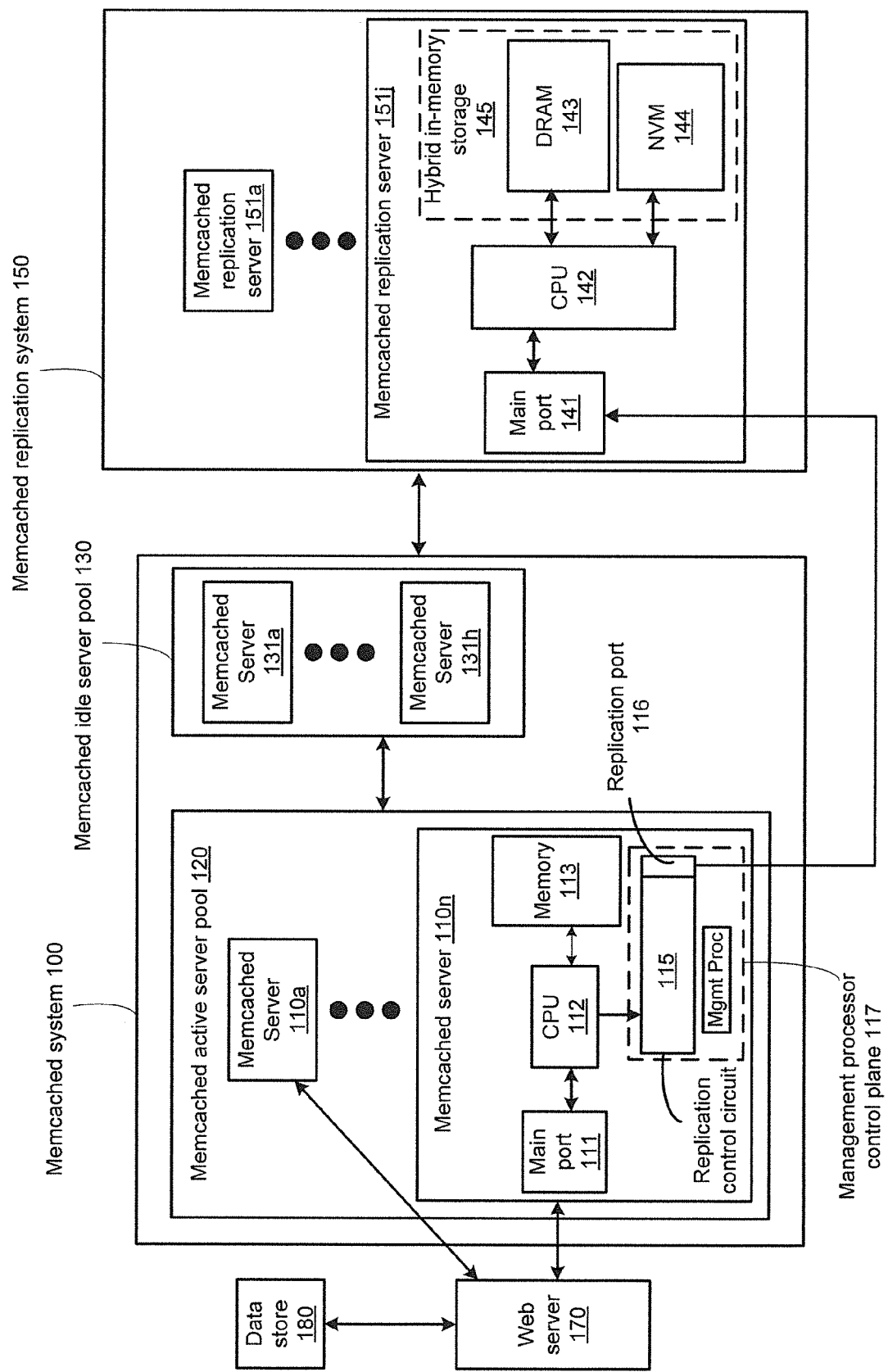
FIG. 1 illustrates a memcached system and a memcached replication system.

FIG. 1 illustrates examples of a memcached system 100 and a memcached replication system 150. The memcached system 100 includes memcached servers 110*a-n* that may be in an active memcached server pool 120, also referred to as active pool 120. An idle memcached server pool 130, also referred to as idle pool 130, includes memcached servers 131*a-h* that are available to be deployed into the active pool 120 when needed. For example, if a memcached server in the active pool 120 fails, the data for the failed memcached server is restored from a memcached replication server in the memcached replication system 150 to a memcached server in the idle pool 130 and that memcached server is moved into the active pool 120 as described in further detail below. Any number of memcached servers may be in the pools 120 and 130 and in the memcached replication system 150. Web sites with heavy traffic may have thousands of memcached servers in their pools to accommodate demand.

A memcached server is a caching system that stores all its cached data in memory. The memcached server may use key-value pairs to store and retrieve data, which may be comprised of small data objects. In one example, the maximum size of requested data is 1 megabyte (MB), and data objects stored in the memcached server may average 250-500 bytes per data object. The small data object size and in-memory storage allows the memcached server to process many requests per second. For example, each data object stored in the memcached servers 110*a-n* is assigned a key and each memcached server may be responsible for a range of the keys. Each memcached server however may be independent and deals with their key range and does not need to communicate with another memcached server to respond to a data request. For example, an application server, such as web server 170, has a library to contact the memcached servers 110*a-n* which determines (possibly dynamically) the appropriate key-to-server mapping. The web server 170 identifies the memcached server to send its request based on the key range of the memcached server, and the memcached server responds to the request. If the data is not stored in the memcached server, then the web server 170 gets the data from the back-end data store 180. The data stored in memcached system 100 is transitory and the web server 17 cannot assume that the requested data is always cached in the system 100.

Components of the memcached server 110*n* are shown. All the memcached servers in the pools 120 and 130 may have the same or similar components. Also, all the memcached servers in the pool 120 may be connected to one or more application servers, such as the web server 170, to respond to data requests and may be connected to a memcached replication server in the replication system 150 to store their data for backups.

The memcached server 110*n* includes a main port 111, such as an Ethernet port, connected to the web server 170 over a network to receive data requests and send replies including requested cached data to the web server 170. The memcached server 110*n* includes a CPU 112 that receives data requests from the web server 170 via the main port 111. For example, the CPU 112 receives a memcached command against an item represented by a key. The CPU 112 executes the command, which may be for a read (retrieval) operation or a write (storage) operation. For example, commands for a write operation may include: a set command, i.e., store this data, possibly overwriting existing data; an add command, i.e., store this data, only if it does not already exist; a replace command, i.e., store this data, but only if the data already exists; an append command, i.e., add this data after the last byte in an existing item and does not allow you to extend past the item limit; a prepend command, i.e., same as append, but adding new data before existing data; a cas (Check and Set) command, i.e., an operation that stores data, but only if no one else has updated the data since you read it last; and invalidate. Examples of commands for a read operation include: a get command, i.e., takes one or more keys and returns all found items; a gets command, i.e., an alternative get command for use with CAS that returns a CAS ID; a delete command, i.e., removes an item from the cache if it exists; and an incr/decr (Increment and Decrement) command, i.e., if an item stored is the string representation of a 64 bit integer, an incr or decr command modifies the number. The memcached server 110*n* includes memory 113, such as DRAM dual in-line memory modules (DIMMs). The read and write operations are performed on the memory 113.

A replication control circuit 115 sends commands related to write or delete operations to a corresponding memcached replication server (e.g., memcached replication server 151*j*) in the replication system 150 that is responsible for backing up data for the memcached server 110*n*. Not all data request commands received at the memcached server 110*n* are sent to the memcached replication server 151*j*. The commands are filtered such that commands that change content stored in the memory 113 rather than all the received commands are sent to the memcached replication server 151*j*. For example, the replication control circuit 115 sends commands for write or delete operations rather than read operations to the memcached replication server 151*j*. The read operation commands are filtered out and are not sent. This conserves bandwidth as commands can be sent to the memcached replication server 151*j* over a network via replication port 116, which may be an Ethernet port for the replication control circuit 115.

For example, the replication control circuit 115 receives write operation commands, such as set, add, invalidate, etc., received at the CPU 112 and copies the commands and data for the write operation to packets, such as an Transmission Control Protocol (TCP) packet and transmits the packets to the memcached replication server 151*j* over a network via replication port 116. User Datagram Protocol (UDP) may be used instead of TCP for sending packets to the replication system 150. The filtering of commands may be performed by the CPU 112 and the filtered commands are sent to the replication control circuit 115. The replication control circuit 115 may wait for the CPU 112 to process certain commands, such as add or append, prior to sending the commands to the replication system 150. Commands may be filtered by the replication control circuit 115 in another example.

The replication control circuit 115 includes a processing circuit to perform its functions. The replication control circuit 115 may comprise a customized processing circuit, such as a field-programmable gate array (FPGA). The replication control circuit 115 may be provided on a separate coprocessor board that interfaces with a motherboard having the CPU 112 via the Peripheral Component Interconnect Express standard interface or another type of interface. In one example, the replication control circuit 115 is provided in a management processor control plane 117, which may include a management processor board with a management processor. The management processor control plane 117 is a separate control plane from the CPU 112 control plane. The management processor board may include an Integrated Lights-Out management processor that can manage server functions and can communicate out-of-band with other management systems. The management processor may include Basic Input/Output System (BIOS) information and can monitor the state of the memcached server and detect failures and reboot the server. In one example, the replication control circuit 115 can detect failure of the memcached server 110*n* based on information provided by the management processor and invoke a restoration process. The replication control circuit 115 and the management processor may be powered by an auxiliary power supply so they can continue to operate in case of power failure of the main power supply which supplies power to the motherboard.

The memcached replication system 150 includes memcached replication servers 151*a-j*. Any number of memcached replication servers may be used for example depending on the amount of data to be replicated. Components for the memcached replication server 151*j* are shown and the same or similar components may be used in each of the memcached replication servers 151*a-j*.

The memcached replication servers 151*a-j* for example operate as backups for the memcached servers 110*a-n* in the active server pool 120. The memcached replication servers 151*a-j* store the cached data from the memcached servers 110*a-n*. Each of the memcached replication servers 151*a-j* may be responsible for storing the data for one or more of the memcached servers 110*a-n*.

Each of the memcached replication servers 151*a-j* use hybrid-in memory storage comprised of two types of memory technologies. One type of memory technology may be NVM and a second type of memory technology may have higher performance than the NVM, such as DRAM. For example, the second type of memory technology has faster data access rates than the NVM. The NVM may have higher memory capacity. For example, the size of the NVM is larger than the DRAM in the memcached replication servers 151*a-j*. For example, the memcached replication server 151*j* includes the hybrid in-memory storage 145 including DRAM 143 and NVM 144 and the size of the NVM 144 is larger than the DRAM 143. Since the size of the NVM (e.g., PCM, memristor) may be greater than DRAMs in the memcached replication servers 151*a-j*, multiple memcached servers (e.g., each of 64 GB or other capacities) in the active pool 120 can be replicated to a single memcached replication server in the system 150. In one example, a special storage technique is employed on the memcached replication servers 151*a-j* so that Most Recently Written (MRW) data items are stored temporarily in DRAM, and eventually propagated to NVM. For example, after a predetermined period of time, 30 minutes, 1 hour, etc., the MRW data is moved to the NVM. Storing MRW data in DRAM provides significant benefits during restoration operations by allowing the most important data to be quickly restored from the replication servers. Other storage policies may be used that dictate what data is stored in each memory.

The memcached replication server 151*j* also includes a CPU 142 and a main port 141. The memcached replication server 151*j* receives commands and/or data from the memcached server 110*n* via the main port 141 and the CPU 142 executes the commands, which for example are for write operations, to store the backup data. The CPU 142 may implement storage polices, such as an MRW policy, to determine which type of memory to store data and when to move data between the DRAM 143 and the NVM 144. Also, in case of failure of the memcached server 110*n*, the CPU 142 executes a restoration process in response to receiving a signal indicative of failure of the memcached server 110*n*.

Figure 2:
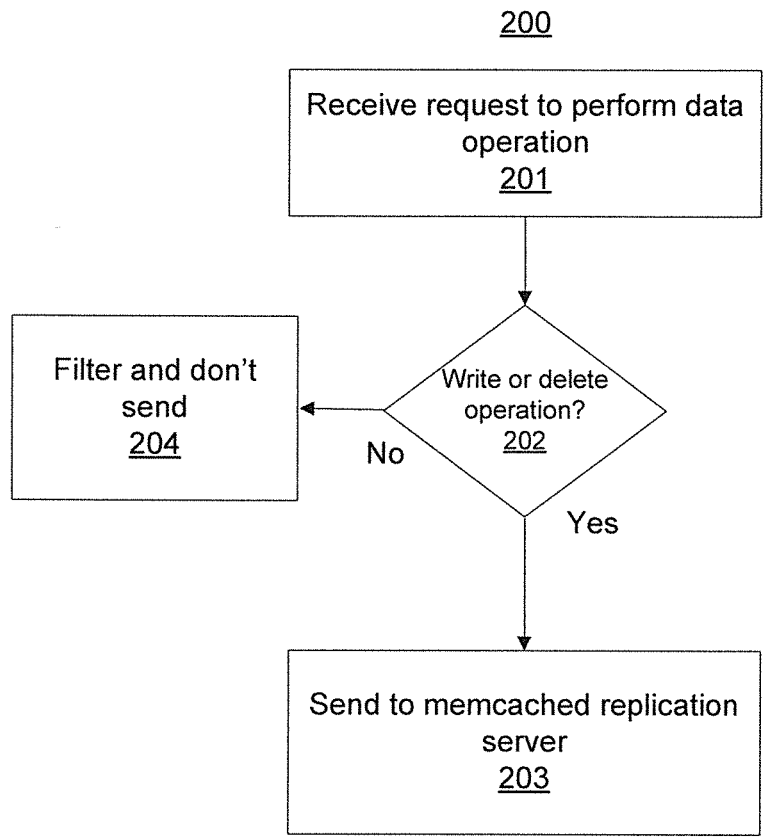
FIG. 2 illustrates a method for a replication process.

FIG. 2 illustrates a method 200 of a replication process according to an example. The method 200 and other methods described below are described by way of example as performed in the memcached system 100 and/or the memcached replication system 150 shown in FIG. 1. The methods may be performed in other systems.

At 201, the memcached server 110*n* receives a request to perform a data operation from an application server, such as the web server 170. The data operation is to be performed on the memory 113. The request may be to read or write or delete data cached for the web server 170. If there is a cache miss, the web server 170 retrieves requested data from the data store 180 which may be persistent storage for the web server 170. The received request may include a command and examples of the commands for read and write and delete operations are described above. For example, the memory 113 is an in-memory key-value store and the CPU 112 receives a memcached command against an item represented by a key in the memory 113. The CPU 112 executes the data operation on the memory 113.

At 202, a determination is made as to whether the received request is for a write or delete operation. For example, the CPU 112 determines whether the request is a command for a memcached write command. In another example the replication control circuit 115 may make the determination. If the request is for a write or delete operation, at 203, the replication control circuit 115 sends an instruction to the memcached replication server 151*j* to perform the data operation on the hybrid in-memory storage 145. For example, the replication control circuit 115 sends a packet with the write operation command and data for the write operation if there is data to the memcached replication server 151*j* via replication port 116. The packet is received via the main port 141, and the write operation command is performed by the CPU 142 in the hybrid in-memory storage 145. If the received request is not for a write or delete operation, the request is filtered and not sent to the memcached replication server 151*j* at 204.

Figure 3:
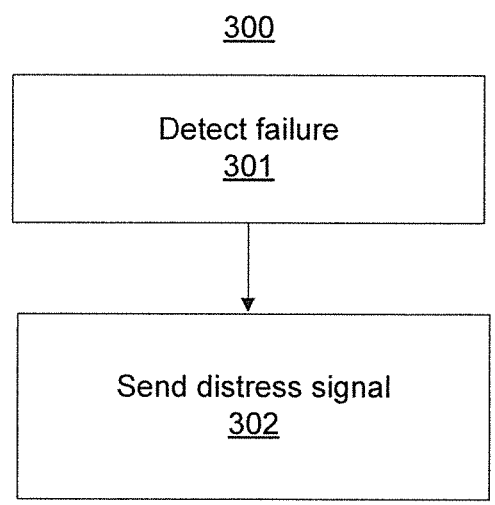
FIG. 3 illustrates a method for failure detection and reporting.
Figure 4:
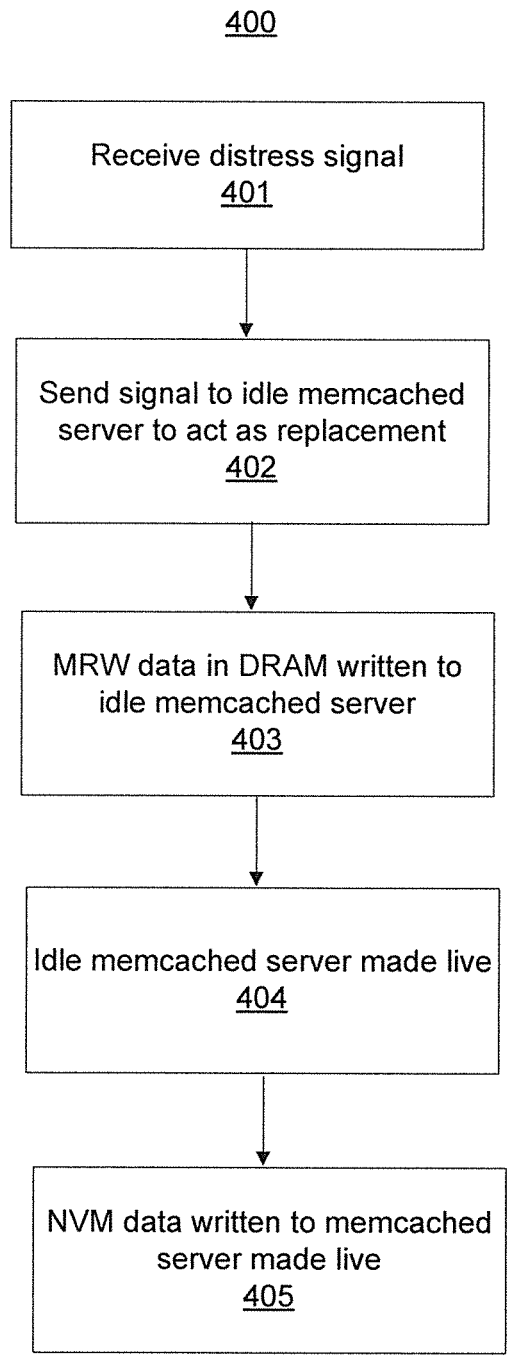
FIG. 4 illustrates a restoration method.

FIG. 3 illustrates a method 300 for failure detection and reporting. At 301, a failure is detected at the memcached server 110*n*. For example, the memcached server 110*n* may temporary or permanently fail, and has to be rebooted or completely left offline. The replication control circuit 115 detects the failure. For example, the CPU 112 sends a signal to the replication control circuit 115 reporting the failure. In some instances, the CPU 112 may be unable to report a failure, such as in the case of power loss to the motherboard. The management processor control plane 117 may include a separate co-processor board with a separate power supply or a short-term power supply. If the replication control circuit 115 is in the management processor control plane 117, the replication control circuit 115 may receive information from the management processor indicative of a system failure. The replication control circuit 115 may receive system information for power sensors, temperature sensors or other sensors and system variables to check for a system failure. In a case of an abrupt change in sensor measurements or system variables, the replication control circuit 115 detects a system failure.

At 302, the replication control circuit 115 sends a distress signal to the memcached replication server 151*j* for example via the replication port 116. The distress signal is indicative of a system failure and may include memcached server identification information for the memcached server 110*n*. The memcached replication server 151*j* may be the replication server for multiple memcached servers in the active pool 120 so the memcached server ID is sent with the distress signal so the memcached replication server 151*j* can identify the data for the proper memcached server to restore. The memcached replication server 151*j* may store key ranges for each memcached server it supports so it can identify the data to restore when a failure of a memcached server that it supports occurs. The replication control circuit 115 for example knows the IP address of the memcached replication server 151*j* which is responsible for storing the backup data for the memcached server 110*n* and sends a packet for the distress signal to the IP address via port 116. The memcached replication server 151*j* receives the distress signal for example via main port 141 and starts a restoration process for the failed memcached server.

A method 400 describes the restoration process. For example, at 401 the memcached replication server 151*j* receives the distress signal for example via main port 141 as described above.

At 402, the memcached replication server 151*j*, which is responsible for the failed memcached server 110*n*, sends a signal to a memcached server in the idle pool 130 to act as a replacement for the failed memcached server 110*n*. For example, the memcached replication server 151*j* may know the IP addresses of memcached servers in the idle pool 130 and sends a signal to a memcached server in the idle pool 130 until one responds with an indication that it is free to operate as a replacement.

After a replacement memcached server is acquired (e.g., memcached server 131*h*) from the idle pool 130, the backup data stored in the hybrid in-memory storage 145 for the memcached server 110*n* is restored to the memory of the memcached server 131*h*. For example at 403, MRW data for the memcached server 110*n* in the DRAM 143 of the hybrid in-memory storage 145 is written to the memory of the memcached server 131*h*. After the completion of MRW data restoration into the idle server, at 404 the memcached server 131*h* is made live for example by informing the web server 170 to update its mappings to refer to the new memcached server 131*h* instead of the memcached server 110*n*. For example, the web server 170 updates its mappings so the key range for the memcached server 110*n* now maps to the memcached server 131*h*. Now the memcached server 131*h* is in the active pool 120. The MRW data is often re-accessed within a short time period so this approach enables a newly started memcached server to capture most accesses without needing all of its cache populated.

At 405, the rest of the backup data for the failed memcached server 110*n*, which may be stored in the NVM 144, is written to the memcached server 131*h*. Given that this replication data is restored while the memcached server 131*h* is live, data can be restored using the add command, which only inserts data if it is not already present in the cache. This command eliminates any consistency issues with restoring older data in conjunction with simultaneous operations from a client.

Some or all of the method and operations and functions described above may be provided as machine readable instructions executable by a processor (e.g., CPUs shown in FIG. 1) or processing circuit (e.g., FPGA or other customized circuit) and stored on a non-transitory computer readable storage medium. For example, they may exist as program(s) comprised of program instructions in source code, object code, executable code or other formats.

While embodiments have been described with reference to the disclosure above, those skilled in the art are able to make various modifications to the described embodiments without departing from the scope of the embodiments as described in the following claims, and their equivalents.

What is claimed is:

1. A replication control circuit to
   receive a request for a write or delete data operation sent to a memcached server from an application server, wherein requests for data operations from the application server that are received at the memcached server are filtered to identify write data operations, and
   send the write or delete data operation to a memcached replication server assigned to the memcached server to perform the write operation on the memcached replication server to back up data for the memcached server,
   wherein the replication control circuit is to detect failure of the memcached server and send a distress signal to the memcached replication server indicating the failure and the distress signal includes an ID for the memcached server,
   wherein the memcached replication server, in response to the distress signal, restores data for the memcached server to an idle memcached server, wherein the restoring includes restoring backup data from dynamic random access memory of the memcached replication server to the idle memcached server, and restoring backup data in non-volatile memory of the memcached replication server to the idle memcached server after the idle memcached server is made live.

2. The replication control circuit of claim 1, wherein the memcached server includes a management processor control plane including a management processor and auxiliary power supply, and the replication control circuit is in the management control plane and receives system information from the management processor to detect whether the memcached server failed.

3. The replication control circuit of claim 1, wherein to send the write or delete data operation to the memcached replication server, the replication control circuit generates a packet including a command for the write or delete data operation and sends the packet via a port to the memcached replication server.

4. The replication control circuit of claim 1, wherein the write or delete data operations comprise a set, add, append or invalidate memcached commands.

5. The replication control circuit of claim 1, wherein the memcached replication server stores backup data for a plurality of memcached servers and the memcached replication server includes a hybrid in-memory storage including non-volatile memory and dynamic random access memory, and most recently written data for the plurality of memcached servers is stored in the dynamic random access memory and moved to the non-volatile memory after a predetermined period of time of being stored in the dynamic random access memory.

6. A memcached replication server storing backup data for an active memcached server, the memcached replication server comprising:

a central processing unit; and
hybrid in-memory storage including non-volatile memory and dynamic random access memory, and most recently written data for the memcached server is stored in the dynamic random access memory and moved to the non-volatile memory after a predetermined period of time of being stored in the dynamic random access memory,
wherein the central processing unit is to restore data for the memcached server to an idle memcached server in response to a failure of the memcached server, and to restore the data, data for the memcached server in the dynamic random access memory is restored to the idle memcached server, the idle memcached server is made live, and remaining data for the memcached server in the non-volatile memory is stored in the live memcached server.

7. The memcached replication server of claim 6, wherein the memcached replication server stores backup data for a plurality of memcached servers, and to restore the data for the failed memcached server, the central processing unit is to identify the data for the failed memcached server from the stored data for the plurality of memcached servers according to a key range for the failed memcached server.

8. The memcached replication server of claim 6, wherein the memcached replication server is to receive a distress signal from a replication control circuit in the memcached replication server, the distress signal including an ID for the memcached replication server and an indication of the failure, and the central processing unit is to perform the restore in response to receiving the distress signal.

9. The memcached replication server of claim 6, wherein prior to failing, the memcached server is to receive requests for data operations from an application server, and the received requests including read operations are filtered and the received requests including write or delete operations are sent to the memcached replication server and executed by the memcached replication server to store backup data for the memcached server.

10. The memcached replication server of claim 9, wherein a replication control circuit of the memcached server copies commands for the write and delete operations to packets and sends the packets to the memcached replication server for execution and commands for the read operations are not sent to the memcached replication server.

11. The memcached replication server of claim 6, wherein the non-volatile memory has a larger size than the dynamic random access memory, and the dynamic random access memory has faster data access rates than the non-volatile memory.

12. A method for restoring data for memcached server comprising:
    storing backup data for the memcached server in a memcached replication server, wherein the memcached replication server includes a hybrid in-memory storage including non-volatile memory and dynamic random access memory, and the backup data is stored in the non-volatile memory and the dynamic random access memory; and
    restoring data for the memcached server to an idle memcached server in response to a failure of the memcached server, wherein the restoring includes restoring the backup data for the memcached server in the dynamic random access memory to a memcached server that is idle, and restoring the backup data in non-volatile memory to the memcached server after the memcached server is made live.

13. The method of claim 12, wherein the memcached replication server stores backup data for a plurality of memcached servers, and the restoring of the data comprises:
    identifying the data for the memcached server in the hybrid in-memory storage according to a key range for the memcached server.

14. The method of claim 12, wherein prior to failing, the memcached server is to receive requests for data operations from an application server, and the received requests including read operations are filtered and the received requests including write or delete operations are sent to the memcached replication server, and the storing of the backup data comprises:
    executing the write or delete operations at the memcached replication server to store the backup data for the memcached server.

15. The method of claim 14, wherein the write operations include memcached commands for set, add, append and invalidate.

\* \* \* \* \*